(12) United States Patent
Xie

(10) Patent No.: US 9,568,765 B2
(45) Date of Patent: Feb. 14, 2017

(54) COLOR FILTER SUBSTRATE AND MANUFACTURING METHOD THEREOF, LIQUID CRYSTAL DISPLAY PANEL AND DISPLAY DEVICE

(71) Applicant: BOE TECHNOLOGY GROUP CO., LTD., Beijing (CN)

(72) Inventor: Chang Xie, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/430,171

(22) PCT Filed: Jun. 18, 2014

(86) PCT No.: PCT/CN2014/080239
§ 371 (c)(1),
(2) Date: Mar. 20, 2015

(87) PCT Pub. No.: WO2015/109739
PCT Pub. Date: Jul. 30, 2015

(65) Prior Publication Data
US 2015/0338702 A1    Nov. 26, 2015

(30) Foreign Application Priority Data

Jan. 22, 2014  (CN) .......................... 2014 1 0030887

(51) Int. Cl.
*G02F 1/1335*    (2006.01)
*G02B 5/20*    (2006.01)

(52) U.S. Cl.
CPC ......... *G02F 1/133516* (2013.01); *G02B 5/201* (2013.01); *G02F 1/133512* (2013.01); *G02F 1/133514* (2013.01)

(58) Field of Classification Search
CPC .................... G02F 1/133512; G02F 1/136209
(Continued)

(56) References Cited

U.S. PATENT DOCUMENTS

2004/0125290 A1    7/2004  Nam et al.
2012/0268700 A1*  10/2012  Shu ........................ G03F 7/0007
                                                                          349/106

FOREIGN PATENT DOCUMENTS

CN    101135744 A    3/2008
CN    101825802 A    9/2010
(Continued)

OTHER PUBLICATIONS

Oct. 28, 2014—(CN) International Search Report for PCT/CN2014/080239.
(Continued)

*Primary Examiner* — Phu Vu
(74) *Attorney, Agent, or Firm* — Banner & Witcoff, Ltd.

(57) ABSTRACT

A color filter substrate and manufacturing method thereof, a liquid crystal display panel and a display device are disclosed. The color filter substrate comprises a substrate, and a black matrix film layer and a color filter layer on the substrate. The black matrix film layer has a plurality of opening regions arranged in an array, the color filter layer is fed into the opening regions, and the color filter layer has an overlapping region with the black matrix film layer at a contact position. The present disclosure can eliminate the angle section difference of the color filter layer on the color filter substrate, improve the smoothness of the alignment layer surface located on the color filter layer, and avoid non-uniform rubbing alignment on the alignment layer surface caused by the un-smooth alignment layer surface, thereby avoid light leakage and the problem of the bad liquidity of the liquid crystal.

13 Claims, 2 Drawing Sheets

(58) Field of Classification Search
USPC .......................................... 349/106, 110–111
See application file for complete search history.

(56) References Cited

FOREIGN PATENT DOCUMENTS

| | | | |
|---|---|---|---|
| CN | 101840099 | A | 9/2010 |
| CN | 101840100 | A | 9/2010 |
| CN | 102262319 | A | 11/2011 |
| CN | 202372730 | U | 8/2012 |
| CN | 102681246 | A | 9/2012 |
| CN | 202677025 | U | 1/2013 |
| CN | 103792720 | A | 5/2014 |
| JP | 200931625 | A | 2/2009 |
| JP | 201153585 | A | 3/2011 |

OTHER PUBLICATIONS

Oct. 28, 2014—(CN) Written Opinion for PCT/CN2014/080239—Eng Tran.
Nov. 19, 2015—(CN)—First Office Action Appn 201410030887.9 with English Tran.

* cited by examiner

COLOR FILTER SUBSTRATE AND MANUFACTURING METHOD THEREOF, LIQUID CRYSTAL DISPLAY PANEL AND DISPLAY DEVICE

The application is a U.S. National Phase Entry of International Application No. PCT/CN2014/080239 filed on Jun. 18, 2014, designating the United States of America and claiming priority to Chinese Patent Application No. 201410030887.9 filed on Jan. 22, 2014. The present application claims priority to and the benefit of the above-identified applications and the above-identified applications are incorporated by reference herein in their entirety.

TECHNICAL FIELD

Embodiments of the present disclosure relate to a color filter substrate and a manufacturing method thereof, a liquid crystal display panel and a display device.

BACKGROUND

Liquid crystal display panel mainly consists of a color filter substrate, an array substrate and a liquid crystal layer between the above two substrates, wherein a black matrix and a color filter layer are disposed on a side of the color filter substrate facing the liquid crystal layer.

As shown in FIG. 1, the color filter substrate comprises a substrate 101, a black matrix 102 and a color filter layer 103 successively disposed on the substrate 101. For preventing light leak, the color filter layer 103 is usually configured to overlap the black matrix 102. However, such configuration would lead to the color filter layer 103 producing a protrusion on the overlapped region (as shown by the dotted block in FIG. 1), that is, the portion that is located in the overlapped region of the color filter layer 103 is higher than other portion that is located in other region, and the height difference between the above two portions is referred to angle section difference. Since the color filter layer 103 on the color filter substrate has angle section difference so that an alignment layer formed on the black matrix 102 and the color filter layer 103 has an unsmooth or uneven surface; and it would occur non-uniform rubbing alignment on the alignment layer when a rubbing process is performed on the alignment layer, resulting in the light leakage. Furthermore, the unsmooth or uneven surface of the alignment layer may result in the bad fluidity of the liquid crystal molecules which contact with the alignment layer, thereby a press chromatic aberration is presented.

SUMMARY

The embodiments of the present disclosure provide a color filter substrate and a manufacturing method thereof, a liquid crystal display panel and a display device.

At least one embodiment of the present disclosure provides a color filter substrate, and the color filter substrate comprises: a substrate, and a black matrix film layer and a color filter layer on the substrate; wherein the black matrix film layer has a plurality of opening regions arranged in an array, the color filter layer is fed into each of the opening regions, and the color filter layer has an overlapping region with the black matrix film layer at contact position.

A surface of the black matrix film layer located in the overlapping region which contacts with the color filter layer is provided with a first groove, at least a portion of the color filter layer located in the overlapping region is fed into the first groove, so that a surface of the color filter layer located in the overlapping region, which faces away from the substrate, is flushed with a surface of the color filter layer located in each of the opening regions, which faces away from the substrate.

In an example, a second groove is provided on a surface of the substrate which is under the first groove and contacts with the black matrix film layer; the second groove has same shape and depth as those of the first groove; and a portion of the black matrix film layer is fed into the second groove.

In an example, the color filter substrate further comprises a transparent film layer between the substrate and the black matrix film layer.

The transparent film layer is provided with a third groove on the surface which is under the first groove and contacts with the black matrix film layer; the third groove has same shape and depth as those of the first groove; and the black matrix film layer is fed into the third groove.

In an example, a surface of the color filter layer located in the opening region, which faces away from the substrate, is flushed with a surface of the black matrix layer located outside of the overlapping region, which faces away from the substrate.

In an example, the first groove is a ring groove surrounding the opening region.

At least one embodiment of the present disclosure also provides a liquid crystal display panel comprising the color filter substrate.

At least one embodiment of the present disclosure also provides a display device comprising the liquid crystal display panel.

At least one embodiment of the present disclosure also provides a method of manufacturing a color filter substrate, the method comprises the following steps.

A pattern of a black matrix film layer is formed on a substrate, wherein the pattern of the black matrix film layer has a plurality of opening regions arranged in an array.

A pattern of the color filter layer is formed on the substrate having the pattern of the black matrix film layer, the pattern of the color filter layer is fed into the opening regions, and the pattern of the color filter layer has an overlapping region with the pattern of the black matrix film layer at a contact position.

A surface of the pattern of the black matrix film layer located in the overlapping region which contacts with the pattern of the color filter layer to be formed is provided with a first groove.

At least a portion of the pattern of the color filter layer located in the overlapping region is fed into the first groove, so that a surface of the pattern of the color filter layer located in the overlapping region, which faces away from the substrate, is flushed with a surface of the pattern of the color filter layer located in the opening regions, which faces away from the substrate.

In an example, the method further comprises forming a second groove on the substrate before forming the pattern of the black matrix film layer on the substrate; wherein the second groove is under the first groove to be formed and has same shape and depth as those of the first groove to be formed.

The pattern of the black matrix film layer to be formed is fed into the second groove.

In an example, the method further comprises: before forming the pattern of the black matrix film layer on the substrate, forming a transparent film layer on the substrate; and forming a third groove on the transparent film layer; wherein the third groove is under the first groove to be formed and has same shape and depth as those of the first groove; and the pattern of the black matrix film layer to be formed is fed into the third groove.

BRIEF DESCRIPTION OF THE DRAWINGS

Embodiments of the present disclosure will be described in detail hereinafter in conjunction with accompanying drawings to allow one of ordinary skill in the art to understand the present disclosure more clearly, in which.

DETAILED DESCRIPTION

The technical solutions of the embodiments of the present disclosure will be described in a clearly and fully understandable way in connection with the drawings related to embodiments of the disclosure. Apparently, the described embodiments are just a part but not all of the embodiments of the disclosure. Based on the described embodiments herein, those skilled in the art can obtain other embodiment(s), without any inventive work, which shall fall within the protection scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

The color filter substrate and manufacturing method thereof, the liquid crystal display panel and the display device of the present disclosure will be described in detail hereinafter in conjunction with the accompanying drawings. It is noted that the shape and thickness of each film layer in the Figures are not in real scale, and it is intended to illustrate the technical contents of the present disclosure.

Figure 1:
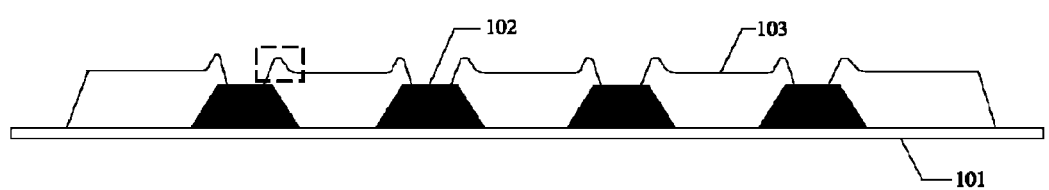
FIG. 1 is a schematic structural view of a color filter substrate.
Figure 2A:
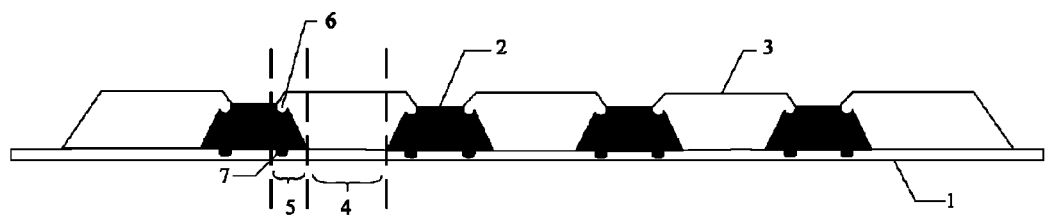
FIG. 2a is a schematic structural view of a color filter substrate according to an embodiment of the present disclosure.
Figure 2B:
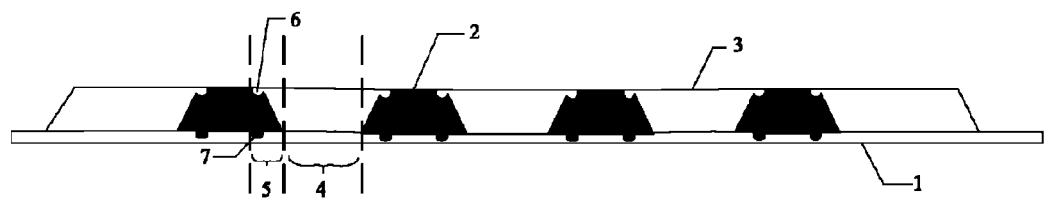
FIG. 2b is a schematic structural view of a color filter substrate according to another embodiment of the present disclosure.

Embodiment of the present disclosure provides a color filter substrate. As shown in FIGS. 2a and 2b, it comprises a substrate 1, and a black matrix film layer 2 and a color filter layer 3 on the substrate 1. The black matrix film layer 2 has a plurality of opening regions 4 arranged in an array, and the color filter layer 3 is fed into the opening regions 4. The color filter layer 3 has an overlapping region 5 with the black matrix film layer 2 at a contact position.

A surface of the black matrix film layer 2 located in the overlapping region 5, which contacts with the color filter layer 3, is provided with a first groove 6, at least a portion of color filter layer 3 located in the overlapping region 5 is fed into the first groove 6; that is, a portion of the color filter layer 3 located in the overlapping region 5 is fed into the first groove 6, and other portions are located outside of the first groove 6. For example, as shown in FIGS. 2a and 2b, the portion of color filter layer 3 located in the overlapping region 5 is fed into the first groove 6, so that a surface of the color filter layer 3 located in the overlapping region 5, which faces away from the substrate 1, is flushed with a surface of the color filter layer 3 located in the opening region 4, which faces away from the substrate 1; that is, the surface of the color filter layer 3 located in the overlapping region 5, which faces away from the substrate 1, is in the same horizontal plane with the surface of the color filter layer 3 located in the opening region 4, which faces away from the substrate 1. If the first groove 6 occupies the whole overlapping region 5 shown in FIG. 2a or 2b, that is, other interfaces of the black matrix film layer 2 and the color filter layer 3 are vertical plane which substantially perpendicular to the substrate 1 except for the first groove 6 in FIG. 2a or 2b, the color filter layer 3 located in the overlapping region 5 is fully fed into the first groove 6.

According to the above color filter substrate provided in the embodiments, since the first groove 6 is provided on the surface of the black matrix film layer 2 located in the overlapping region 5 which contacts with the color filter layer 3, at least a portion of the color filter layer 3 located in the overlapping region 5 can be fed into the first groove 6, so that the surface of the color filter layer 3 located in the overlapping region 5, which faces away from the substrate 1, is flushed with the surface of the color filter layer 3 located in each of the opening regions 4, which faces away from the substrate 1, the angle section difference of the color filter layer 3 on the color filter substrate is eliminated, thereby the smoothness of the alignment layer surface formed on the color filter layer 3 is improved. In this way, it would avoid non-uniform rubbing alignment on the alignment layer surface caused by un-smooth alignment layer surface, so as to avoid light leakage and the problem of the bad liquidity of the liquid crystal.

To allow the surface of the color filter layer 3 located in the overlapping region 5, which faces away from the substrate 1, be flushed with the surface of the color filter layer 3 located in each of the opening regions 4, which faces away from the substrate 1, so that the surface of alignment layer formed on the color filter layer 3 be smoother, and to effectively avoid light leakage and the problem of the bad liquidity of the liquid crystal, the first groove 6 formed on the surface of the black matrix film layer 2 typically has a depth of 0.1-0.5 µm.

For example, in order to facilitate forming the first groove 6, in the above color filter substrate provided by the embodiments of the present disclosure, a second groove 7 is provided on the surface of the substrate 1 which is directly under the first groove 6 and contacts with the black matrix film layer 2. The second groove 7 has a same shape as that of the first groove 6, and the second groove 7 has a same depth as that of the first groove 6. A portion of the black matrix film layer 2 is fed into the second groove 7 so that the first groove 6 is naturally formed on the surface of the black matrix film layer 2 located in the overlapping region 5 which contacts with the color filter layer 3.

Figure 3A:
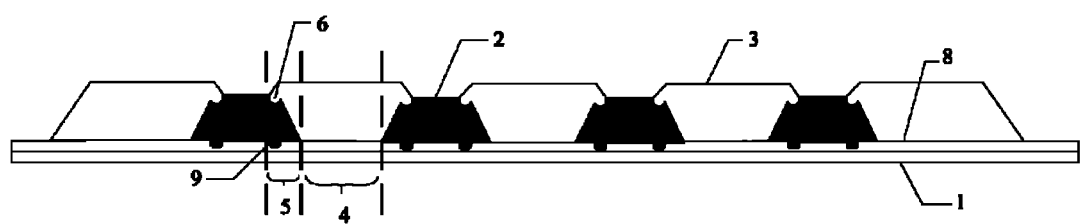
FIG. 3a is a schematic structural view of a color filter substrate according to yet another embodiment of the present disclosure.
Figure 3B:
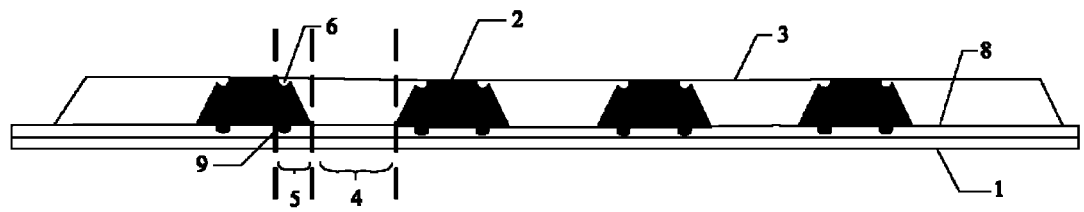
FIG. 3b is a schematic structural view of a color filter substrate according to further yet another embodiment of the present disclosure.

Since a typical substrate 1 is made of glass, it is hard to pattern the substrate 1. For conveniently implementing a pattern process to form the first groove 6, the color filter substrate provided by the embodiment of the present disclosure, as shown in FIGS. 3a and 3b, further comprises a transparent film layer 8 between the substrate 1 and the black matrix film layer 2. The transparent film layer 8 may be made of transparent resin material, because the resin material is easily patterned, or other similar transparent material, which is not limited herein.

As shown in FIGS. 3a and 3b, a third groove 9 is provided on a surface of the transparent film layer 8, which is directly under the first groove 6 and contacts with the black matrix film layer 2. The third groove 9 has a same shape as that of the first groove 6, and the third groove 9 has a same depth as that of the first groove 6. A portion of the black matrix film layer 2 is fed into the third groove 9 so that the first groove 6 is naturally formed on the surface of the black matrix film layer 2 located in the overlapping region 5 which contacts with the color filter layer 3

A half-tone mask or gray mask can also be directly used to pattern the black matrix film layer 2 to form the pattern of the first groove 6. The fully light-transmission region of the mask corresponds to the region on which the black matrix film layer 2 located in the opening region 4 would be formed, the partially light-transmission region of the mask corresponds to the region on which the first groove 6 would be formed. In this case, the second groove 7 on the substrate 1 can be omitted, or the third groove 9 on the transparent film layer 8 can be omitted.

To allow the surface of the alignment layer formed on the black matrix film layer 2 and the color filter layer 3 be smoother, so as to avoid non-uniform rubbing alignment on the alignment layer surface caused by un-smooth alignment layer surface, thereby to avoid light leakage and the problem of the bad liquidity of the liquid crystal, or the like, in the above color filter substrate provided by the embodiment of the present disclosure, as shown in FIGS. 2b and 3b, the surface of the color filter layer 3 located in the opening region 4, which faces away from the substrate 1, can be flushed with the surface of the black matrix film layer 2 located outside of the overlapping region 5, which faces away from the substrate 1; that is, the surface of the color filter layer 3 located in the opening region 4, which faces away from the substrate 1, is in the same horizontal plane with the surface of the black matrix film layer 2 located outside of the overlapping region 5, which faces away from the substrate 1.

According to embodiment of the present disclosure, the first groove 6 can be a ring groove surrounding the opening region 4, and also can be other shapes which can implement the above color filter substrate provided by embodiments of the present disclosure, but the present disclosure is not limited thereto.

An embodiment of the present disclosure also provides a method of manufacturing a color filter substrate, the method comprises: forming a pattern of a black matrix film layer on a substrate, wherein the pattern of the black matrix film layer has a plurality of opening regions arranged in an array; and forming a pattern of the color filter layer on the substrate having the pattern of the black matrix film layer, wherein the pattern of the color filter layer is fed into the opening regions, and the pattern of the color filter layer has an overlapping region with the pattern of the black matrix film layer at a contact position.

Forming the pattern of the black matrix film layer on the substrate comprises forming a first groove on a surface of the pattern of the black matrix film layer located in the overlapping region which contacts with the pattern of the color filter layer to be formed.

Forming the pattern of the color filter layer on the substrate having the pattern of the black matrix film layer comprises feeding at least a portion of the pattern of the color filter layer located in the overlapping region into the first groove so that a surface of the pattern of the color filter layer located in the overlapping region, which faces away from the substrate, is flushed with a surface of the pattern of the color filter layer located in each of the opening regions, which faces away from the substrate.

For conveniently forming the first groove, the manufacturing method provided by embodiment of the present disclosure can further comprise forming a second groove on the substrate before forming the pattern of the black matrix film layer on the substrate. The second groove is directly under the first groove to be formed and has a same shape and depth as those of the first groove to be formed. A portion of the pattern of the black matrix film layer to be formed is fed into the second groove so that the first groove is naturally formed on the surface of the pattern of the black matrix film layer 2 located in the overlapping region which contacts with the color filter layer 3 to be formed.

The second groove can be formed by patterning the substrate, or pressing films on the substrate, but the present disclosure is not limited thereto.

Since a current substrate is typically made of glass, it is hard to pattern the substrate. For conveniently implementing a pattern process to form the first groove, the manufacturing method provided by embodiment of the present disclosure can further comprise forming a transparent film layer on the substrate before forming the pattern of the black matrix film layer on the substrate; and forming a third groove on the transparent film layer.

The third groove is directly under the first groove to be formed and has a same shape and depth as those of the first groove to be formed. A portion of the black matrix film layer is fed into the third groove so that the first groove is naturally formed on the surface of the pattern of the black matrix film layer located in the overlapping region which contacts with the pattern of the color filter layer to be formed.

A half-tone mask or gray mask can also be directly used to perform a pattern process to form the black matrix film layer having the first groove; wherein the fully light-transmission region of the mask corresponds to the region on which the black matrix film layer located in the opening region would be formed, the partially light-transmission region of the mask corresponds to the region on which the first groove would be formed. In this case, the second groove on the substrate can be omitted, or the third groove on the transparent film layer can be omitted.

An embodiment of the present disclosure also provides a liquid crystal display panel comprising the color filter substrate provided by embodiments of the present disclosure. The implementation of the liquid crystal display can refer to the embodiments of the color filter substrates, which is not repeated herein.

An embodiment of the present disclosure also provides a display device comprising the liquid crystal display panel provided by embodiments of the present disclosure. The display device can be any products or components with display function, such as a telephone, a panel personal computer, a television, a display, a laptop computer, a digital photo frame, a navigator. The implementation of the display device can refer to the embodiments of the liquid crystal display panel, which is not repeated herein.

The embodiments of the present disclosure provide a color filter substrate and manufacturing method thereof, a liquid crystal display panel and a display device. The color filter substrate comprises a substrate, and a black matrix film layer and a color filter layer provided on the substrate in turn; wherein the black matrix film layer has a plurality of opening regions arranged in an array, the color filter layer is fed into the opening regions, and the color filter layer has an overlapping region with the black matrix film layer at a contact position. Since a surface of the black matrix film layer located in the overlapping region which contacts with the color filter layer is provided with a first groove, at least a portion of color filter layer located in the overlapping region can be fed into the first groove, so that a surface of the color filter layer located in the overlapping region, which faces away from the substrate, is flushed with a surface of the color filter layer located in each of the opening regions, which faces away from the substrate, the angle section difference of the color filter layer on the color filter substrate is eliminated, thereby the smoothness of the alignment layer surface formed on the color filter layer is improved; therefore, it would avoid non-uniform rubbing alignment on the alignment layer surface caused by an un-smooth alignment layer surface, thereby avoid light leakage and the problem of the bad liquidity of the liquid crystal.

It is understood that the described above are only illustrative embodiments and implementations for explaining the present disclosure, and the present disclosure is not intended to limited thereto. For one of ordinary skill in the art, various modifications and improvements may be made without departing from the spirit and scope of embodiments of the present disclosure, and all of which should fall within the protection scope of the present disclosure. The scope of the present disclosure is defined by the appended claims.

The present disclosure claims priority of Chinese patent application No. 201410030887.9 filed on Jan. 22, 2014 titled "a color filter substrate and manufacturing method thereof, a liquid crystal display panel and a display device", the entire contents of which are incorporated herein by reference.

What is claimed is:

1. A color filter substrate, comprising:
a substrate; and
a black matrix film layer and a color filter layer on the substrate;
wherein the black matrix film layer has a plurality of opening regions arranged array, the color filter layer is fed into the opening regions, and the color filter layer overlapping region with the black matrix film layer at a contact position,
a first groove is provided on a surface of the black matrix turn layer located in the overlapping region which contacts the color filter layer, at least a portion of the color filter located in the overlapping region is fed into the first groove, so that a surface of the color filter layer located in the overlapping region, which faces away from the substrate, is flushed with a surface of the color filter layer located in each of the opening regions, which faces away from the substrate; and
a second groove is provided on a surface of the substrate which is under the first groove and contacts the black matrix film layer; the second groove has a same shape and depth as those of the first groove; a portion of the black matrix film layer is fed into the second groove.

2. A color filter substrate, comprising:
a substrate;
a black matrix tin layer and a color filter layer on the substrate, and
a transparent film layer between the substrate and the black matrix film layer,
wherein the black matrix film layer has a plurality of opening regions arranged in an array, the color filter layer is fed into the opening regions, and the color filter layer has an overlapping region with the black matrix film layer at a contract position;
a first groove is provided on a surface of the black matrix film layer located in the overlapping region which contacts the color filter layer, at least a portion of the color filter layer located in the overlapping region is fed into the first groove, so that a surface of the color filter layer located in the overlapping region, which faces away from the substrate, is flushed with a surface of the color filter layer located in each of the opening regions, which faces away from the substrate,
a second groove is provided on a surface of the substrate which is under the first groove and contacts the black matrix film layer, the second groove has a same shape and depth as those of the first groove: a portion of the black matrix film layer is fed into the second groove; and
a third groove is provided on a surface of the transparent film layer which is under the first groove and contacts the black matrix film layer; the third groove has a same shape and depth as those of the first groove; and a portion of the black matrix film layer is fed into the third groove.

3. The color filter substrate according to claim 1, wherein a surface of the color filter layer located in the opening region, which faces away from the substrate, is flushed with a surface of the black matrix layer located outside of the overlapping region, which faces away from the substrate.

4. The color filter substrate according to claim 1 wherein the first groove is a ring groove surrounding the opening region.

5. A liquid crystal display panel, comprising the color filter substrate according to claim 1.

6. A method of manufacturing a color filter substrate, comprising:
forming a pattern of a black matrix film layer on a substrate, wherein the pattern of the black, matrix film layer has a plurality of opening regions arranged ii an array;
forming a pattern of the color filter layer on the substrate having the pattern of the black matrix film layer, the pattern of the color filter layer is fed into each of the opening regions, and the pattern of the color filter layer has an overlapping region with the pattern of the black matrix film layer at a contact position;
forming a first groove on a surface of the pattern of the black matrix film layer located in the overlapping region which contacts the pattern of the color filter layer to be formed; and
feeding at least a portion of the pattern of the color filter layer located in the overlapping region into the first groove so that a surface of the pattern of the color filter layer located in the overlapping region, which faces away from the substrate, is flushed with a surface of the pattern of the color filter layer located in each of the opening regions which faces away from the substrate;
forming a second groove on the substrate before forming the pattern of the black matrix film layer on the substrate; wherein the second groove is under the first groove to be formed and has a same shape and depth as that of the first groove to be formed; and feeding a portion of the pattern of the black matrix film layer to be formed into the second groove.

7. The manufacturing method according to claim 6, further comprising:

forming a transparent film layer on the substrate before forming the pattern of the black matrix film layer on the substrate; and forming a third groove on the transparent film layer; wherein the third groove is under the first groove to be formed and has a same shape and depth as those of the first groove; and a portion of the pattern of the black matrix film layer to be formed is fed into the third groove.

8. The color filter substrate according to claim 2, wherein a surface of the color filter layer located in the opening region, which faces away from the substrate, is flushed with a surface of the black matrix layer located outside of the overlapping region, which faces away from the substrate.

9. The color filter substrate according to claim 8, wherein the first groove is a ring groove surrounding the opening region.

10. The color filter substrate according to claim 2, wherein the first groove is a ring groove surrounding the opening region.

11. The color filter substrate according to claim 3, wherein the first groove is a ring groove surrounding the opening region.

12. A liquid crystal display panel, comprising the color filter substrate according to claim 2.

13. A display device, comprising the liquid crystal display panel according to claim 12.

* * * * *